US011935683B2

(12) United States Patent
Kim et al.

(10) Patent No.: US 11,935,683 B2
(45) Date of Patent: Mar. 19, 2024

(54) COIL ELECTRONIC COMPONENT

(71) Applicant: SAMSUNG ELECTRO-MECHANICS CO., LTD., Suwon-si (KR)

(72) Inventors: Yu Jong Kim, Suwon-si (KR); Jong Min Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 450 days.

(21) Appl. No.: 16/591,283

(22) Filed: Oct. 2, 2019

(65) Prior Publication Data

US 2020/0185142 A1 Jun. 11, 2020

(30) Foreign Application Priority Data

Dec. 7, 2018 (KR) ........................ 10-2018-0157290

(51) Int. Cl.
*H01F 27/28* (2006.01)
*H01F 27/02* (2006.01)

(52) U.S. Cl.
CPC ....... *H01F 27/2804* (2013.01); *H01F 27/022* (2013.01); *H01F 2027/2809* (2013.01)

(58) Field of Classification Search
CPC ......... H01F 27/2804; H01F 2027/2809; H01F 17/0013; H01F 17/0006; H01F 5/003; H01F 27/022
USPC .................................................. 336/200, 232
See application file for complete search history.

(56) References Cited

U.S. PATENT DOCUMENTS

| | | | | |
|---|---|---|---|---|
| 4,959,631 A * | 9/1990 | Hasegawa | H01F 17/0006 336/200 |
| 10,614,943 B2 | 4/2020 | Choi et al. | |
| 10,658,103 B2 | 5/2020 | Seino et al. | |
| 10,902,988 B2 | 1/2021 | Choi et al. | |
| 2007/0085647 A1* | 4/2007 | Kawarai | H01F 17/0006 336/83 |
| 2013/0249662 A1* | 9/2013 | Tonoyama | H01F 27/255 336/200 |

(Continued)

FOREIGN PATENT DOCUMENTS

| | | | |
|---|---|---|---|
| CN | 106158242 A | 11/2016 | |
| CN | 106783069 A * | 5/2017 | H01F 17/0013 |

(Continued)

OTHER PUBLICATIONS

Office Action issued in corresponding Korean Patent Application No. 10-2018-0157290 dated Apr. 1, 2023, with English translation.

(Continued)

*Primary Examiner* — Tszfung J Chan
(74) *Attorney, Agent, or Firm* — MORGAN, LEWIS & BOCKIUS LLP

(57) ABSTRACT

A coil electronic component includes a support substrate, a coil pattern disposed on the support substrate, an encapsulant encapsulating at least portions of the support substrate and the coil pattern, and external electrodes disposed externally on the encapsulant and connected to the coil pattern. The coil pattern includes a seed layer having a thickness of 1.5 μm or less and a plating layer disposed on the seed layer.

18 Claims, 4 Drawing Sheets

(56) References Cited

U.S. PATENT DOCUMENTS

| | | | | |
|---|---|---|---|---|
| 2014/0285305 | A1* | 9/2014 | Yoo | H01F 27/255 336/200 |
| 2015/0048920 | A1* | 2/2015 | Lee | H01F 17/0006 336/219 |
| 2016/0163444 | A1* | 6/2016 | Choi | H01F 41/043 336/200 |
| 2016/0172097 | A1* | 6/2016 | Jeong | H01F 41/046 29/606 |
| 2016/0336105 | A1* | 11/2016 | Choi | H01F 27/255 |
| 2017/0032884 | A1* | 2/2017 | Choi | H01F 41/046 |
| 2017/0148562 | A1* | 5/2017 | Lee | H01F 17/04 |
| 2017/0287621 | A1* | 10/2017 | Seino | H01F 1/26 |
| 2018/0054900 | A1 | 2/2018 | Ueda et al. | |
| 2018/0175494 | A1 | 6/2018 | Horikawa et al. | |

FOREIGN PATENT DOCUMENTS

| | | | | | |
|---|---|---|---|---|---|
| CN | 107430922 | A | | 12/2017 | |
| JP | H04-005806 | A | | 1/1992 | |
| JP | 2004-319570 | A | | 11/2004 | |
| JP | 2004319570 | A | * | 11/2004 | |
| JP | 2008118059 | A | * | 5/2008 | |
| JP | 2016-072615 | A | | 5/2016 | |
| JP | 2017-34227 | A | | 2/2017 | |
| JP | 2017-183663 | A | | 10/2017 | |
| JP | 2017-216485 | A | | 12/2017 | |
| JP | 2018-098415 | A | | 6/2018 | |
| KR | 10-1442402 | B1 | | 9/2014 | |
| KR | 2017097883 | A | * | 8/2017 | H01F 17/0013 |
| KR | 10-2017-0113136 | A | | 10/2017 | |
| WO | WO-2016147993 | A1 | * | 9/2016 | H01F 17/0013 |
| WO | WO-2017171265 | A1 | * | 10/2017 | C25D 3/38 |

OTHER PUBLICATIONS

Office Action issued in corresponding Japanese Patent Application No. 2019-182606 date Jul. 11, 2023, with English translation.

Office Action issued in corresponding Chinese Patent Application No. 201911187884.5 dated Nov. 22, 2023, with English translation.

Office Action issued corresponding Japanese Patent Application No. 2019-182606 dated Jan. 9, 2024, with English translation.

* cited by examiner

COIL ELECTRONIC COMPONENT

CROSS-REFERENCE TO RELATED APPLICATION(S)

This application claims benefit of priority to Korean Patent Application No. 10-2018-0157290 filed on Dec. 7, 2018 in the Korean Intellectual Property Office, the disclosure of which is incorporated herein by reference in its entirety.

BACKGROUND

1. Field

The present disclosure relates to a coil electronic component.

2. Description of Related Art

As electronic devices such as digital televisions, mobile phones, laptops, and the like, have been designed to have reduced sizes, coil electronic components used in such electronic devices have been required to have reduced sizes. To meet such demand, a large number of studies have been conducted into developing new types of coil-type or thin-film type coil electronic components.

An important consideration in developing a coil electronic component having a reduced size is the maintenance of the same properties as before after reducing the size of the coil electronic component. To this end, it may be necessary to increase a content of a magnetic material filling a core. However, there may be a limitation in increasing a content of the magnetic material due to requirements on the strength of an inductor body, changes in frequency properties caused by insulating property, and for other reasons.

There have been numerous attempts to further reduce a thickness of a chip that includes a coil electronic component as a set having a complex structure, multifunctionality, a reduced size, and the like. Accordingly, in the respective technical field, it has been necessary to secure high performance and reliability of a chip having a reduced size.

SUMMARY

An aspect of the present disclosure is to provide a coil electronic component which may secure sufficient performance even when a size of the coil electronic component is reduced by reducing a gap between coil patterns. Also, when a through-hole is formed in a support substrate, process impacts applied to the support substrate and other components may be reduced.

According to an aspect of the present disclosure, a coil electronic component includes a support substrate, a coil pattern disposed on the support substrate, an encapsulant encapsulating at least portions of the support substrate and the coil pattern, and external electrodes disposed externally on the encapsulant and connected to the coil pattern, and the coil pattern includes a seed layer having a thickness of 1.5 μm or less and a plating layer disposed on the seed layer.

The seed layer may have a thickness of 0.5 μm or greater.

The coil pattern may form a plurality of turns, and turns adjacent to each other may be spaced apart from each other by a pitch of 35 μm or less.

The support substrate may have a thickness of 20 μm or greater to 40 μm or less.

The plating layer may include a first plating layer disposed on the seed layer and a second plating layer covering the first plating layer.

The first plating layer may be a pattern plating layer, and may have a same width as a width of the seed layer.

The second plating layer may cover an upper surface and side surfaces of the first plating layer, and may cover side surfaces of the seed layer.

The second plating layer may be an isotropic plating layer.

The plating layer may further include a third plating layer disposed on an upper surface of the second plating layer.

The third plating layer may be an anisotropic plating layer.

The encapsulant may have a thickness of 0.65 mm or less.

The seed layer may be configured as a Cu layer.

According to another aspect of the present disclosure, a coil electronic component includes a support substrate, a coil pattern forming a plurality of turns disposed on the support substrate, an encapsulant extending between adjacent turns of the coil pattern and encapsulating at least portions of the support substrate and the coil pattern, and external electrodes disposed externally on the encapsulant and connected to the coil pattern. The coil pattern has a coil pitch distance between an outer side surface of adjacent turns that is 35 μm or less.

The coil pattern may have a seed layer and a plating layer disposed on the seed layer, and a coil pitch distance between an outer side surface of adjacent turns of the seed layer may be 35 μm or less.

The seed layer may have a thickness of 1.5 μm or less.

The encapsulant may include a cover portion extending from an uppermost surface of the coil pattern to an upper surface of the encapsulant, and a thickness of the cover portion, in a thickness direction orthogonal to a surface of the support substrate having the coil pattern thereon, may be smaller than a thickness of the coil pattern in the thickness direction.

The coil pattern may include first and second coil patterns disposed on opposing surfaces of the support substrate and connected in series by a via extending through the support substrate, and each of the first and second coil patterns may include a seed layer contacting a respective one of the opposing surfaces of the support substrate and having a thickness of 1.5 μm or less, and a plating layer disposed on the seed layer and having a thickness greater than the seed layer.

Each of the first and second coil patterns may include a plurality of turns, and turns of the first coil pattern may overlap with a space between turns of the second coil pattern along a thickness direction orthogonal to the opposing surfaces of the support substrate.

The encapsulant may include an upper cover portion extending from an uppermost surface of the first coil pattern to an upper surface of the encapsulant, and a lower cover portion extending from an lowermost surface of the second coil pattern to a lower surface of the encapsulant, and thicknesses of the upper and lower cover portions, in a thickness direction orthogonal to the opposing surfaces of the support substrate, may be smaller than thicknesses of the first and second coil patterns in the thickness direction.

The coil pattern may have a seed layer and a plating layer disposed on the seed layer, and the seed layer may have a thickness of 0.5 μm or greater and 1.5 μm or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
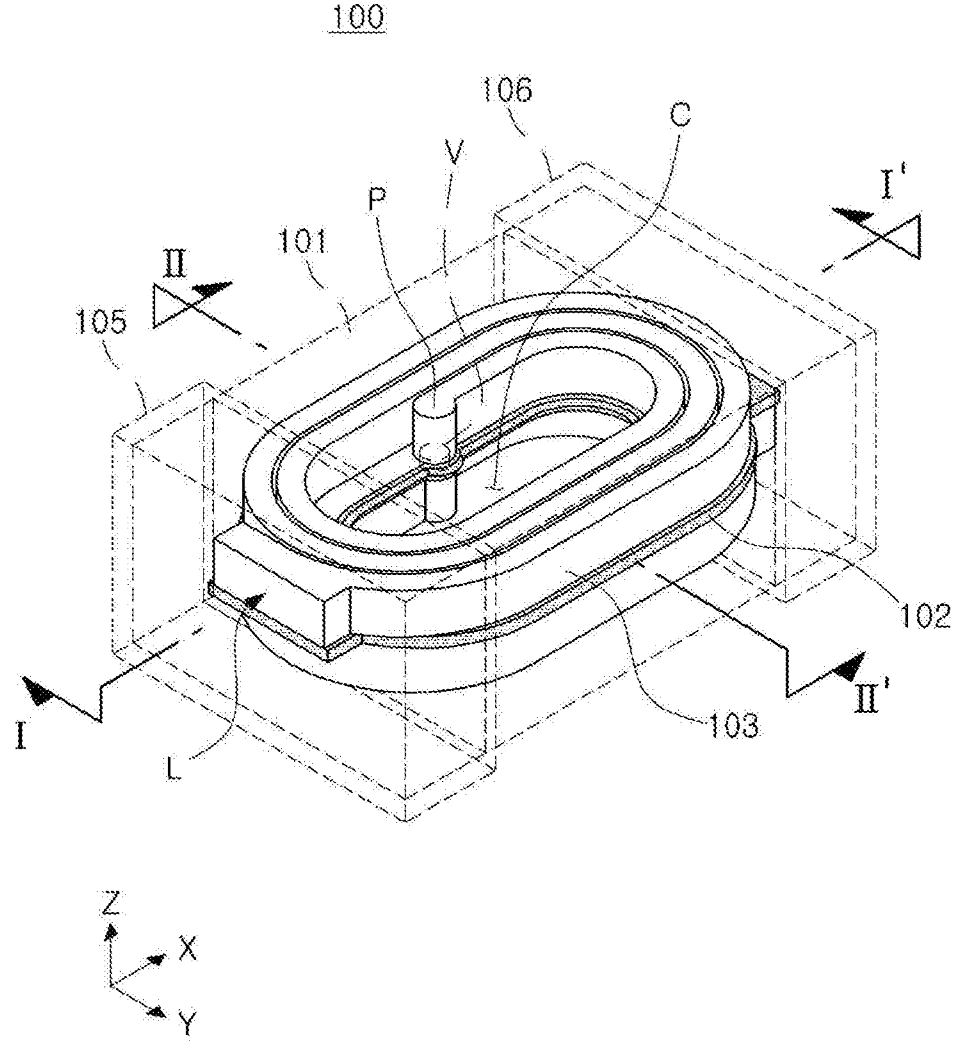
FIG. 1 is a perspective diagram illustrating a coil electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clarity of illustration and description. Also, elements having the same function as each other within the scope of the same concept represented in the drawing of each exemplary embodiment will be described using the same reference numeral.

Figure 2:
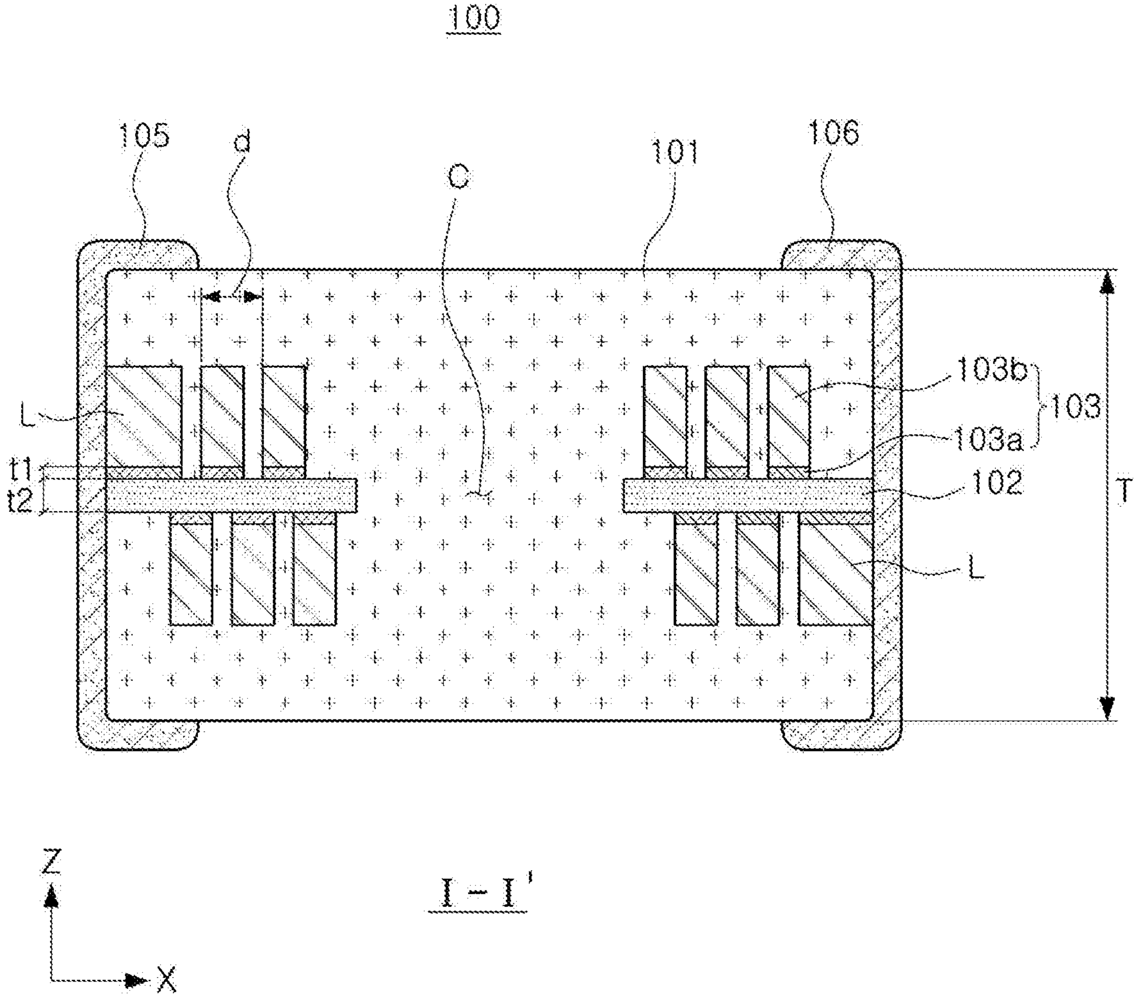
FIGS. 2 and 3 are cross-sectional diagrams taken along lines I-I' and II-II' in FIG. 1, respectively.
Figure 3:
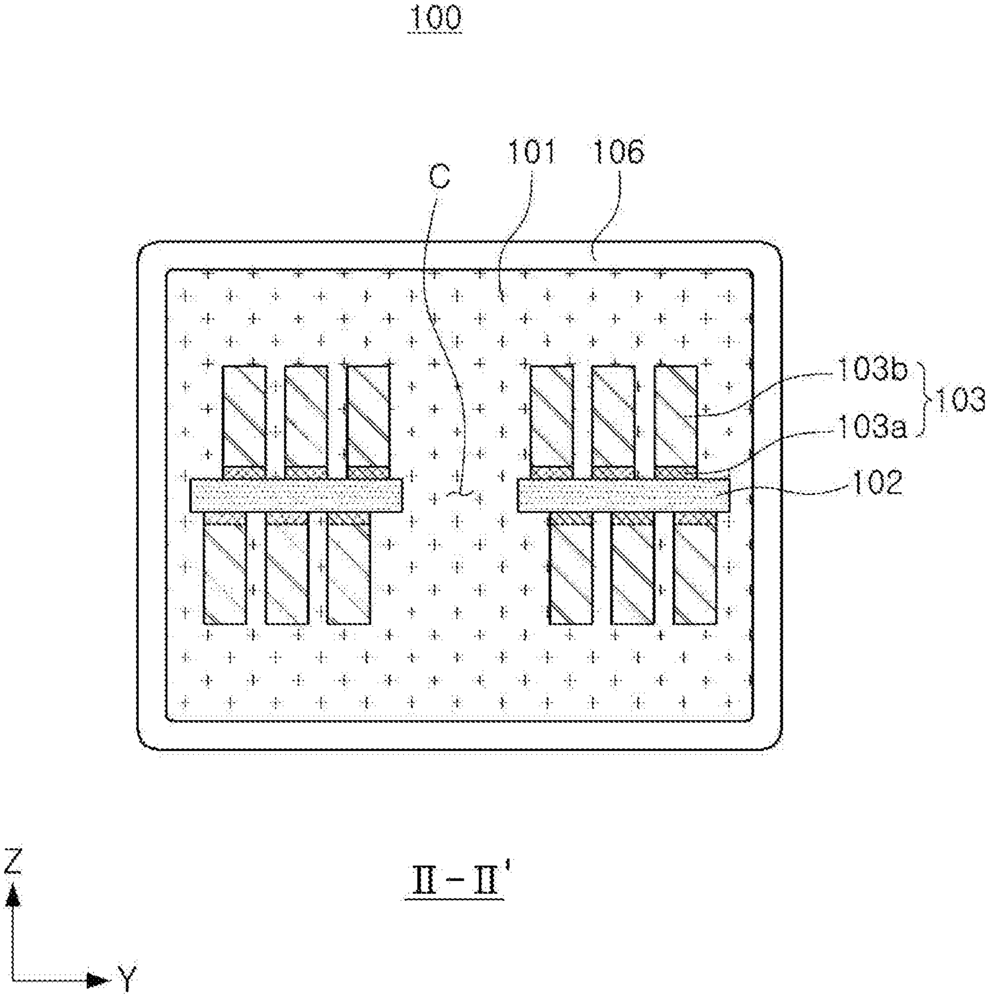

FIG. 1 is a perspective diagram illustrating a coil electronic component according to an example embodiment. FIGS. 2 and 3 are cross-sectional diagrams taken along lines I-I' and II-II' in FIG. 1, respectively.

Referring to the diagrams, a coil electronic component 100 in the example embodiment may include an encapsulant 101, a support substrate 102, a coil pattern 103, and external electrodes 105 and 106, and the coil pattern 103 may include a seed layer 103*a* and a plating layer 103*b* disposed on the seed layer 103*a*. A thickness t1 of the seed layer 103*a* may be configured to be 1.5 μm or less, and accordingly, the plating layer 103*b* to be etched in accordance with a shape of the coil pattern 103 may not be overly etched. The configuration will be described in greater detail later.

The encapsulant 101 may encapsulate at least portions of the support substrate 102 and the coil pattern 103, and may form an exterior of the coil electronic component 100. In the example embodiment, a length (a length taken in an X direction in FIG. 1) of the encapsulant 101 may be greater than a thickness (a length taken in a Z direction in FIG. 1), and a ratio of the thickness to the length of the encapsulant 101 may be 0.6 or less. The coil electronic component 100 having a reduced thickness as described above may be configured as a low profile component. In this case, a thickness T of the encapsulant 101 may be 0.65 mm or less. In the coil electronic component 100 having a low profile form, there may be a limitation in increasing a size of the coil pattern 103 such that it may be difficult to improve electrical and magnetic properties. In the example embodiment, a gap between the coil patterns 103 may be reduced by reducing a thickness of the seed layer 103*a*, or other methods, and accordingly, even when a size of the coil electronic component 100 is reduced, properties such as inductance, and the like, may be sufficiently secured.

When a region of the encapsulant 101 covering the coil pattern 103 is defined as a cover portion (e.g., a region between an uppermost surface of the coil pattern 103 and an upper surface of the encapsulant 101), a thickness of the cover portion may be less than a thickness of the coil pattern 103. A thickness of the coil pattern 103 may be two times or more than a thickness of the cover portion or greater. Thus, by increasing a thickness of the coil pattern 103 as compared to thicknesses of the support substrate 102 and the cover portion, direct current resistance properties and series inductance Ls property of the coil electronic component 100 may improve.

The encapsulant 101 may be configured to externally expose a partial region of a lead-out pattern L. The encapsulant 101 may include magnetic particles, and an insulating resin may be interposed between the magnetic particles. Surfaces of the magnetic particles may be coated with an insulating film. As the magnetic particles included in the encapsulant 101, ferrite, a metal, and the like, may be used. When the magnetic particles are implemented by a metal, the magnetic particles may be an Fe-based alloy, and the like. For example, the magnetic particles may be a nanocrystalline particle boundary alloy having a composition of Fe—Si—B—Cr, an Fe—Ni based alloy, and the like. As an example, a particle size of an Fe-based alloy particle may be 0.1 μm or greater to 20 μm or less, and the Fe-based alloy particles may be distributed on a polymer such as an epoxy resin or polyimide. When the magnetic particles are implemented by an Fe-based alloy, magnetic properties such as permeability may improve, but the magnetic particles may be vulnerable to electrostatic discharge (ESD). Accordingly, an additional insulation structure may be interposed between the coil pattern 103 and the magnetic particles. Also, the encapsulant 101 may fill a region between adjacent patterns or windings in the coil pattern 103 as illustrated in the diagram.

The support substrate 102 may support the coil pattern 103, and may be implemented as a polypropylene glycol (PPG) substrate, a ferrite substrate, or a metal-based soft magnetic substrate, and the like. As illustrated in the diagram, a through hole C may be formed in a central portion of the support substrate 102, penetrating through the thickness of the support substrate 102, and the through hole C may be filled with the encapsulant 101, thereby forming a magnetic core portion C. In the example embodiment, a thickness t2 of the support substrate 102 may be 20 μm or greater to 40 μm or less, which may be less than a thickness of a support substrate used in a general coil electronic component. By reducing the thickness t2 of the support substrate 102 as compared to a thickness of a support substrate used in a general coil electronic component, a thickness of the coil pattern 103 may increase, and the amount of the encapsulant 101 filling a region between the coil patterns 103 may increase. Accordingly, as a thickness of the coil pattern 103 increases with reference to a component having the same thickness, direct current resistance (Rdc) property may improve, and as the amount of magnetic particles included in the encapsulant 101 increases, the Ls property may also improve.

The coil pattern 103 may be disposed on at least one of a first surface (an upper surface in FIG. 2) and a second surface (a lower surface in FIG. 2) of the support substrate 102 opposing each other in the thickness direction (e.g., Z direction). As in the example embodiment, the coil pattern 103 may be disposed on both the first surface and the second surface of the support substrate 102, or alternatively, the coil pattern 103 may be only disposed on one of the first and second surfaces. The coil pattern 103 may include a pad region P, and the coil patterns 103 formed on the first surface and the second surface of the support substrate 102 may be connected to each other by a via V penetrating through the support substrate 102 in the pad region P. The via V penetrating the support substrate 102 may be formed by forming a through-hole using a laser process and filling the through-hole with a conductive layer. When the laser process is performed, process impacts may be applied to the support substrate 102. As described above, when the support substrate 102 has a relatively thin thickness of 20 to 40 μm, laser process energy may be reduced, and process impacts applied to the support substrate 102 may decrease. Also, a size of the via V formed in the support substrate 102 may be reduced such that a size of the coil electronic component 100 may easily be reduced. Further, the laser process may also be performed while the seed layer 103*a* is formed. When the seed layer 103*a* having a relatively thin thickness of 1.5 μm or less is used as in the example embodiment, laser process impacts may be further reduced.

As described above, the coil pattern 103 may include the seed layer 103*a* having a thickness t1 of 1.5 μm or less, and the plating layer 103*b* disposed on the seed layer 103*a*. In this case, the seed layer 103*a* may have a thickness of 0.5 μm or greater. The seed layer 103*a* may be configured as a Cu layer configured as a Cu thin film. Alternately, the seed layer 103*a* may include other metal elements such as Ag, Pt, Ni, and the like, and may not include Cu. By configuring a thickness of the seed layer 103*a* to be less than a thickness of a seed layer used in a general coil electronic component, a gap between turns in the coil pattern 103 may be reduced, and accordingly, the number of turns of the coil pattern 103, a size of the core portion C, and the like, may increase. The increase of the number of turns of the coil pattern 103, the increase of a size of the core portion C, and the like, may improve an inductance property of the coil electronic component 100. For example, referring to FIG. 2, the coil pattern 103 may form a plurality of turns or windings, and turns/windings adjacent to each other may be spaced apart from each other by a pitch d of 35 μm or less. As shown in FIG. 2, the pitch d may be a distance between an outer side surface of adjacent turns of the coil pattern 103.

Figure 4:
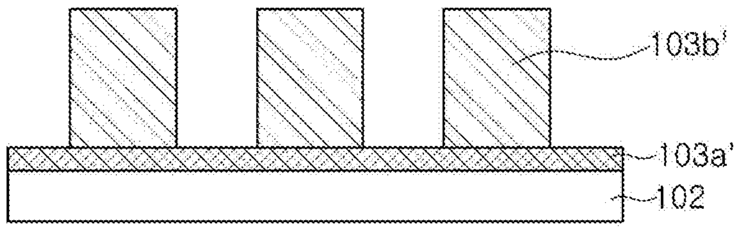
FIGS. 4 and 5 are diagrams illustrating an example method of forming a coil pattern in the coil electronic component illustrated in FIG. 1.
Figure 5:
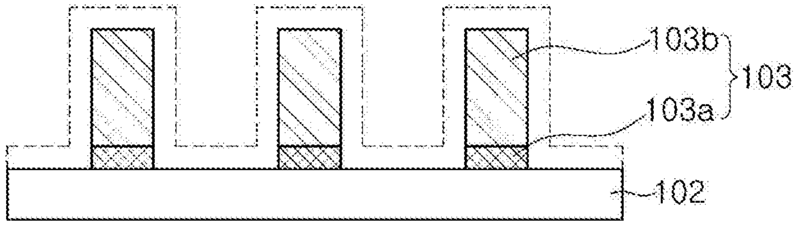

An example embodiment in which a fine pitch is implemented by a seed layer 103*a* having a relatively thin thickness will be described with reference to FIGS. 4 and 5. FIG. 4 illustrates an example in which a seed layer 103*a*' and a plating layer 103*b*' are formed in order on a support substrate 102. The plating layer 103*b*' may be configured as a pattern plating layer formed using the seed layer 103*a*' as a seed, and may include elements such as Cu, Ag, Pt, Ni, and the like. As the seed layer 103*a*' illustrated in FIG. 4 is formed on an overall surface of the support substrate 102, it may be required to etch the seed layer 103*a*' in accordance with a shape of the coil pattern 103. When the seed layer 103*a*' is etched, the plating layer 103*b*' may also be etched. FIG. 5 illustrates an example in which the etching process is completed, and the dotted line in the diagram indicates an outer outline of the seed layer 103*a*' and the plating layer 103*b*' prior to the etching process. By the etching process, the seed layer 103*a*' and the plating layer 103*b*' may have the same width. Moreover, as a result of the etching process, the plating layer 103*b*' may have its width reduced by a thickness proportional to the thickness of the seed layer 103*a*'.

When the seed layer 103*a*' has a relatively great thickness, the plating layer 103*b*' may be overly etched. Accordingly, a thickness of the coil pattern 103 may be reduced, and a gap between turns may increase. According to the experiments performed in the present disclosure, when the thickness t1 of the seed layer 103*a* was configured to be 1.5 μm or less, an over-etching of the plating layer 103*b*' can be significantly decreased. However, when the thickness t1 of the seed layer 103*a* is excessively thin, a recess may be formed in the support substrate 102 when an etching process is performed, and it may be difficult to form the coil pattern 103. Table 1 below reports experimental test result obtained under different test conditions including whether a fine pitch is implemented, whether a recess is formed in a substrate, and whether a coil is implemented, depending on a thickness of the seed layer 103*a*. In the tests, whether a fine pitch is implemented was determined as "0" when a distance of each of turns adjacent to each other in the coil pattern 103 was 35 μm or less.

TABLE 1

| | Thickness of Seed Layer (μm) | Whether Fine Pitch is Implemented | Whether Recess is Formed | Whether Coil is Implemented |
|---|---|---|---|---|
| Comparative Example 1 | 2.0 | X | X | ○ |
| Comparative Example 2 | 1.8 | X | X | ○ |
| Embodiment 1 | 1.5 | ○ | X | ○ |
| Embodiment 2 | 1.2 | ○ | X | ○ |
| Embodiment 3 | 0.9 | ○ | X | ○ |
| Embodiment 4 | 0.7 | ○ | X | ○ |
| Embodiment 5 | 0.5 | ○ | X | ○ |
| Comparative Example 3 | 0.4 | ○ | ○ | X |
| Comparative Example 4 | 0.3 | ○ | ○ | X |

As indicated in the result of the tests, when a thickness of the seed layer exceeded 1.5 μm, a gap between the coil patterns increased such that it was impossible to implement a fine pitch. That is because the coil pattern was overly etched during the process of etching the seed layer, the pitch of the resulting coil was increased beyond the maximum threshold for the fine pitch. When a thickness of the seed layer was less than 0.5 μm, a recess was formed in the substrate. Accordingly, it has been indicated that a preferable thickness of the seed layer may be 0.5 μm or greater to 1.5 μm or less.

In the description below, the other components of the coil electronic component 100 will be described with reference to FIGS. 1, 2, and 3. The external electrodes 105 and 106 may be disposed externally of the encapsulant 101 and may each be connected to a respective lead-out pattern L. The external electrodes 105 and 106 may be formed using a paste including a metal having a high electrical conductivity, and the paste may be a conductive paste including one of nickel (Ni), copper (Cu), tin (Sn), or silver (Ag), or alloys thereof, for example. Each of the external electrodes 105 and 106 may further include a plating layer formed thereon. In this case, the plating layer may include one or more elements selected from a group consisting of nickel (Ni), copper (Cu), and tin (Sn). For example, a nickel (Ni) plated layer and a tin (Sn) plated layer may be formed in order.

The lead-out pattern L may be disposed in an outermost region of the coil pattern 103, may provide a connection path with the external electrodes 105 and 106, and may be configured to be integrated with the coil pattern 103. In this case, as illustrated in the diagram, the lead-out pattern L may be configured to have a width greater than a width of the coil pattern 103 so as to extend to, contact, and thereby be connected to the external electrodes 105 and 106. The width may be a width taken in the X direction in FIGS. 1 and 2.

Figure 6:
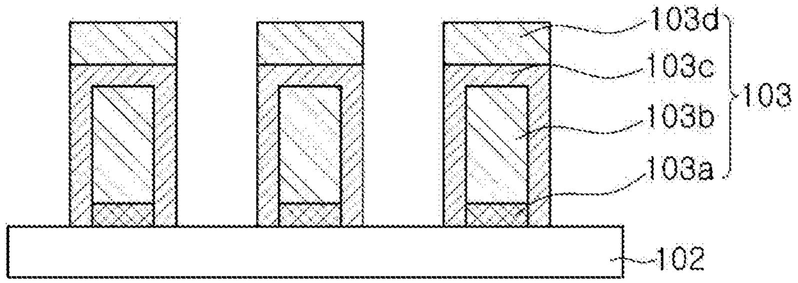
FIG. 6 is a diagram illustrating a coil electronic component according to a modified example embodiment of the present disclosure.

In the description below, a modified example of a coil electronic component will be described with reference to FIG. 6. FIG. 6 only illustrates a support substrate 102 and a coil pattern 103, and the other components may be configured the same as in the aforementioned example embodiment. In the modified example, a coil pattern 103 may include a seed layer 103*a* and a plurality of plating layers 103*b*, 103*c*, and 103*d*. The plurality of plating layers 103*b*, 103*c*, and 103*d* will be referred to as a first plating layer 103*b*, a second plating layer 103*c*, and a third plating layer 103*d*, respectively. The first plating layer 103*b* may be configured as a pattern plating layer formed using the seed layer 103*a* as a seed as described above, and may have a width the same as a width of the seed layer 103*a*.

The second plating layer 103*c* may cover an upper surface and side surfaces of the first plating layer 103*b*, and side surfaces of the seed layer 103*a*. In this case, the second plating layer 103*c* may be configured as an isotropic plating layer. The third plating layer 103*d* may be disposed in an upper portion of the second plating layer 103*c*, and may be configured as an anisotropic plating layer, a growth of which is facilitated in a thickness direction rather than in a width direction. FIG. 6 illustrates an example in which the third plating layer 103*d* only covers an upper surface of the second plating layer 103*c*, but an example embodiment thereof is not limited thereto. The third plating layer 103*d* may also cover side surface(s) of the second plating layer 103*c*. As in the modified example, the coil pattern 103 may have a multilayer structure, and in this case, an aspect ratio of the coil pattern 103 may improve such that direct current resistance (Rdc) property, and the like, of the coil pattern 103 may improve.

According to the aforementioned example embodiments, in the coil electronic component, by implementing the coil pattern using a seed pattern having a relatively thin thickness, a gap between the coil patterns may be reduced, and even when a size of the coil electronic component is reduced, high performance may be obtained.

While the exemplary embodiments have been shown and described above, it will be apparent to those skilled in the art that modifications and variations could be made without departing from the scope of the present invention as defined by the appended claims.

What is claimed is:

1. A coil electronic component, comprising:

a support substrate;

a coil pattern disposed on the support substrate;

an encapsulant encapsulating at least portions of the support substrate and the coil pattern; and external electrodes disposed externally on the encapsulant and connected to the coil pattern, wherein the coil pattern includes a seed layer having a thickness of 1.5 μm or less and a plating layer disposed on the seed layer, the plating layer includes a first plating layer, having a single-layer structure, disposed on the seed layer, a second plating layer covering the first plating layer, and a third plating layer disposed on an upper surface of the second plating layer, and a thickness of the first plating layer is larger than the sum of a thickness of the second plating layer and a thickness of the third plating layer, where the thickness of the second plating layer is measured from the upper surface of the second plating layer and an upper surface of the first plating layer.

2. The coil electronic component of claim 1, wherein the seed layer has a thickness of 0.5 μm or greater and 1.5 μm or less.

3. The coil electronic component of claim 1, wherein the coil pattern forms a plurality of turns, and turns adjacent to each other are spaced apart from each other by a pitch of 35 μm or less.

4. The coil electronic component of claim 1, wherein the support substrate has a thickness of 20 μm or greater to 40 μm or less.

5. The coil electronic component of claim 1, wherein the first plating layer is a pattern plating layer and has a same width as a width of the seed layer.

6. The coil electronic component of claim 1, wherein the second plating layer covers an upper surface and side surfaces of the first plating layer, and covers side surfaces of the seed layer.

7. The coil electronic component of claim 6, wherein the second plating layer is an isotropic plating layer.

8. The coil electronic component of claim 1, wherein the third plating layer is an anisotropic plating layer.

9. The coil electronic component of claim 1, wherein the encapsulant has a thickness of 0.65 mm or less.

10. The coil electronic component of claim 1, wherein the seed layer is a Cu layer.

11. A coil electronic component comprising:

a support substrate;

a coil pattern forming a plurality of turns disposed on the support substrate;

an encapsulant extending between adjacent turns of the coil pattern and encapsulating at least portions of the support substrate and the coil pattern; and external electrodes disposed externally on the encapsulant and connected to the coil pattern, wherein the coil pattern has a coil pitch distance between an outer side surface of adjacent turns that is 35 μm or less, the coil pattern has a seed layer and a plating layer disposed on the seed layer, the plating layer includes a first plating layer, having a single-layer structure, disposed on the seed layer, a second plating layer covering the first plating layer, and a third plating layer disposed on an upper surface of the second plating layer, and a thickness of the first plating layer is larger than the sum of a thickness of the second plating layer and a thickness of the third plating layer, where the thickness of the second plating layer is measured from the upper surface of the second plating layer and an upper surface of the first plating layer.

12. The coil electronic component of claim 11, wherein a coil pitch distance between an outer side surface of adjacent turns of the seed layer is 35 μm or less.

13. The coil electronic component of claim 12, wherein the seed layer has a thickness of 1.5 μm or less.

14. The coil electronic component of claim 11, wherein the encapsulant includes a cover portion extending from an uppermost surface of the coil pattern to an upper surface of the encapsulant, and a thickness of the cover portion, in a thickness direction orthogonal to a surface of the support substrate having the coil pattern thereon, is smaller than a thickness of the coil pattern in the thickness direction.

15. The coil electronic component of claim 11, wherein the coil pattern includes first and second coil patterns disposed on opposing surfaces of the support substrate and connected in series by a via extending through the support substrate, and each of the first and second coil patterns includes the seed layer contacting a respective one of the opposing surfaces of the support substrate and having a thickness of 1.5 μm or less, and the plating layer disposed on the seed layer and having a thickness greater than the seed layer.

16. The coil electronic component of claim 15, wherein each of the first and second coil patterns includes a plurality of turns, and turns of the first coil pattern overlap with a space between turns of the second coil pattern along a thickness direction orthogonal to the opposing surfaces of the support substrate.

17. The coil electronic component of claim 15, wherein the encapsulant includes an upper cover portion extending from an uppermost surface of the first coil pattern to an upper surface of the encapsulant, and a lower cover portion extending from an lowermost surface of the second coil pattern to a lower surface of the encapsulant, and thicknesses of the upper and lower cover portions, in a thickness direction orthogonal to the opposing surfaces of the support substrate, is smaller than thicknesses of the first and second coil patterns in the thickness direction.

18. The coil electronic component of claim 11, wherein the seed layer has a thickness of 0.5 μm or greater and 1.5 μm or less.

* * * * *